(12) United States Patent
Tillin

(10) Patent No.: US 6,496,241 B1
(45) Date of Patent: Dec. 17, 2002

(54) LIQUID CRYSTAL DEVICE AND DISPLAY

(75) Inventor: Martin David Tillin, Abingdon (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/274,664

(22) Filed: Mar. 23, 1999

(30) Foreign Application Priority Data

Mar. 26, 1998 (GB) .............................................. 9806566

(51) Int. Cl.[7] .......................................... G02F 1/1335

(52) U.S. Cl. ...................................... 349/117; 349/119

(58) Field of Search ................................ 349/121, 117, 349/119, 102

(56) References Cited

U.S. PATENT DOCUMENTS

| | | | |
|---|---|---|---|
| 3,912,369 A | * 10/1975 | Kashnow | 349/117 |
| 3,972,587 A | * 8/1976 | Scheffer | 349/180 |
| 4,767,190 A | 8/1988 | Dir et al. | 350/339 |
| 5,237,438 A | * 8/1993 | Miyashita et al. | 349/119 |
| 5,291,323 A | * 3/1994 | Ohnishi et al. | 349/120 |
| 5,490,003 A | 2/1996 | Van Sprang | 359/63 |
| 5,519,523 A | * 5/1996 | Madokoro et al. | 349/117 |
| 5,847,790 A | * 12/1998 | Andersson et al. | 349/100 |
| 6,023,317 A | * 2/2000 | Xu et al. | 349/118 |
| 6,100,944 A | * 8/2000 | Sharp et al. | 349/19 |
| 6,205,904 B1 | * 3/2001 | Tillin et al. | 349/119 |

FOREIGN PATENT DOCUMENTS

| | | |
|---|---|---|
| EP | 0522620 | 1/1993 |
| EP | 0811870 | 12/1997 |
| EP | 0840160 | 5/1998 |
| GB | 1477478 | 6/1977 |
| WO | 9715255 | 5/1997 |

OTHER PUBLICATIONS

Search Report for GB Application No. GB 9806566.7; Dated Jun. 25, 1998.
K. H. Yang, Euro Display 1996, LP–B, pp. 449–451, "A Self–Compensated Twisted Nematic Mode for Reflective Light Valves".
E. Beynon et al., 1997 SID, L–34–L–37, "Single Polariser Reflective Twisted Nematics".
Wu et al., Appl. Phys. Lett 68 (11), Mar. 11, 1996, pp. 1455–1457, "Mixed–Mode Twisted Nematic Liquid Crystal Cells for Reflective Displays".
Yariv, et al., 1984, pp. 62–63, John Wiley & Sons, "Optical Waves in Crystals".
Hirakata et al., SID 1995 Digest, P–49, pp. 563–566, "A High–Contrast Wide–Viewing–Angle Low–Twisted–Nematic LCD Mode".
S. Palmer, Applied Optics, vol. 36, No. 10, Apr. 1, 1997, pp. 2094–2100, "Liquid–Crystal Cell with a Wide Viewing Angle and a High Cell Contrast".

* cited by examiner

Primary Examiner—William L. Sikes
Assistant Examiner—Dung Nguyen
(74) Attorney, Agent, or Firm—Renner, Otto, Boisselle & Sklar

(57) ABSTRACT

A liquid crystal device such as a display comprises a twisted liquid crystal layer whose surface director orientation at a first surface is oriented in a first direction and whose surface director orientation at a second surface is oriented in a second different non-perpendicular direction. The layer is disposed, for instance, between a linear polarizer and a reflector. A retarder is disposed between the layer and the polarizer and compensates for residual retardation of the layer at a first voltage across the layer. For instance, the retarder has a retardation substantially equal to the residual retardation and an optic axis perpendicular to the bisectrix of the orientations.

23 Claims, 13 Drawing Sheets

LIQUID CRYSTAL DEVICE AND DISPLAY

FIELD OF THE INVENTION

The invention relates to a liquid crystal device and to a liquid crystal display incorporating such a device. Such a display may comprise a reflective display for use in low power equipment or in bright environments, such as outdoor sunshine, where a back lit display would be difficult to read.

BACKGROUND OF THE INVENTION

A known type of reflective liquid crystal display comprises a liquid crystal layer disposed between a linear polarizer and a reflector. The liquid crystal layer is switchable between a first state, in which polarized light from the polarizer is incident on the reflector with linear polarization, and a second state, in which light from the polarizer is incident with circular polarization on the reflector. When linearly polarized light is incident on the reflector, it is reflected without effectively changing its polarization azimuth. The display or picture element (pixel) of the display in this mode is reflective and appears bright. In the second mode, the circularly polarized light is reflected by the reflector with the opposite sense of circular polarization. In this case, the display or the pixel appears dark. The liquid crystal layer may provide linear polarization in the absence of an applied electric field across the layer, in which case the display is of the normally white type. Alternatively, the liquid crystal layer may provide circular polarization in the absence of an applied field, in which case the display is of the normally black type.

A known display of this type has a twisted nematic liquid crystal layer. Beynon et al, Proceeding of the International Display Research Conference, 1997, L-34 relates to this type of display and derives values for the liquid crystal parameters of retardation, twist and alignment orientation necessary to produce circular polarization by the layer. Most of these sets of parameters are such that the display brightness approaches a maximum value asymptotically as the electric field across the liquid crystal layer approaches infinity. Thus, the maximum brightness white state cannot be achieved for a finite applied field.

U.S. Pat. No. 5,490,003 and Yang, Euro Display 1996, pp 449 disclose an arrangement where the maximum brightness can be achieved. However, this arrangement has a somewhat chromatic dark state and the maximally bright state occurs at a relatively high voltage.

Untwisted liquid crystal displays of this type exhibit the same problem of being unable to achieve the maximum brightness white state for finite applied field. U.S. Pat. No. 4,767,190 discloses an arrangement of this type in which an additional fixed retarder of relatively low retardation is disposed optically adjacent the untwisted liquid crystal layer with the optic axes of the retarder and the layer crossed. The retardation of the additional retarder is therefore effectively subtracted from the retardation provided by the liquid crystal layer and this allows the maximum brightness white state to be achieved for a finite applied field. However, this technique is not applicable to twisted liquid crystal displays because the direction of the director, and hence the optic axis, varies azimuthally so that perfect cancellation of retardation cannot be achieved.

In order to achieve a high contrast ratio (the ratio of light reflected by the display in its maximal reflection state to light reflected by the display in its darkest state), the dark state should be made as achromatic as possible. This requires that the light incident on the reflector for the dark state should be as close to perfectly circularly polarized as possible for as much of the visible spectrum as possible. In order to improve the achromaticity of the dark state, it is known to provide extra retarders which are optically in series with the twisted liquid crystal layer, generally between the layer and the linear polarizer. For instance, it is known to provide an achromatic quarter wave retarder between the polarizer and the twisted liquid crystal layer as disclosed in Wu et al, Appl. Phys. Lett., 1996, 68, pp 1455.

In the display or pixel dark state, the liquid crystal layer should have minimal effect on the polarization of light from the retarder so that the achromaticity of the display should be determined by the achromatic quarter wave retarder. In the bright state, the liquid crystal layer converts the circular polarization produced by the quarter wave retarder to linear polarization. However, the liquid crystal layer only has zero retardation at infinite voltage so that there is some residual retardation which degrades the achromaticity of the dark state and requires as large a voltage as possible to achieve the best possible dark state. Further, most achromatic quarter wave retarders are formed from combinations of retarders and are therefore usually circular polarizers rather than quarter waveplates, which compounds the problem further.

In the case of twisted liquid crystal layers, the only exception to the problem of residual retardation is in the case where the twist of the liquid crystal is 90°. In this case, the surface portions of the liquid crystal layer approximately cancel each other when the voltage and hence applied field across the layer exceeds a predetermined value (assuming equal pretilts at both liquid crystal layer surfaces). For instance, Wu et al, Appl. Phys. Lett., 1996, 68, pp 1455, discloses a twisted nematic liquid crystal display of this type including an achromatic retarder. However, such a display cannot achieve as bright a white state as displays in which the liquid crystal twist is different from 90° except for much larger retardation.

The term "optic axis" as used herein refers exclusively to the slow axis of a birefringent material.

SUMMARY OF THE INVENTION

According to a first aspect of the invention, there is provided a liquid crystal device including: a layer of twisted liquid crystal having a first surface director orientation oriented in a first direction at a first surface of the layer and a second surface director orientation oriented in a second direction at a second surface of the layer, the first direction being different from and non-perpendicular to the second direction; a retarder arranged to compensate for a residual retardation of the layer with a first finite applied field across the layer, the retarder having an optic axis which is substantially parallel or perpendicular to the bisectrix of the first and second directions; and a reflector for reflecting light transmitted through the layer.

The retarder may have a retardation substantially equal to the residual retardation and the optic axis of the retarder may be substantially perpendicular to the bisectrix.

The term "bisectrix" as used herein is used essentially in its conventional mathematical sense i.e. the direction in the smaller included angle between the first and second directions and equiangularly spaced from each. Further, the term "surface director orientation" as used herein is defined as the orientation of the director at an alignment surface projected onto the alignment surface plane of the liquid crystal layer, so that the surface director orientation is the orientation which the director would have in the absence of any surface pretilt. Also, the surface director orientation (SDO) is equivalent to (SDO±π). Thus, the first and second directions and the bisectrix are located in a common plane which is perpendicular to the optical axis of the device.

The retarder may be a waveplate whose retardation differs from λ/4 by the residual retardation, where λ is a working wavelength of the device. In one embodiment, the retardation of the retarder may be substantially equal to the sum of λ/4 and the residual retardation and the optic axis of the retarder may be substantially perpendicular to the bisectrix of the first and second directors. In another embodiment, the retardation of the retarder may be substantially equal to the difference between λ/4 and the residual retardation and the optic axis of the retarder may be substantially parallel to the bisectrix of the first and second directions.

The direction of twist of the layer is defined to be positive if the liquid crystal director twists clock-wise in the direction of propagation of light through the layer and negative if the direction of twist is anti-clockwise.

The retarder may be disposed between the layer and at least one λ/2 plate.

The layer may produce a retardation substantially equal to λ\4 with a second finite applied electric field across the layer, where the second applied field is different from the first applied field and λ is working wavelength of the device. The second applied field may correspond to zero potential difference across the layer.

The first applied field may correspond to a potential difference across the layer of less than or equal to seven volts.

The layer may be homogeneously aligned.

The layer may be pixellated.

The retarder and the layer may be disposed between a linear polarizer and a reflector. The retarder may be disposed between the layer and a quarter waveplate.

According to a second aspect of the invention, there is provided a liquid crystal display including a device in accordance with the first aspect of the invention.

It is thus possible to provide a device in which a twisted liquid crystal is used as a retarder and the device is capable of providing a retardation substantially equal to zero at a chosen finite voltage. For instance, in the case of single polarizer reflective displays using twisted liquid crystal, the contrast ratio of the display may be increased by a factor of between 2 and 10 compared with known displays of this type. The device can achieve a dark state of good achromaticity for any chosen voltage applied across the liquid crystal layer. For instance, the dark state may be achieved for an applied voltage less than 5 volts so as to allow the device to be used in an active matrix addressing arrangement.

Reflective displays are frequently used in low power equipment because of the lower power consumption. For instance, reflective displays do not require a back light so that the power consumed by a back light is avoided. As the retardation of the retarder increases, the voltage at which the dark state is achieved falls. This allows the driving voltage of a display of this type to be made as low as possible. As a result, it is possible to reduce the power consumption of a display of this type.

The invention will be further described, by way of example, with reference to the accompanying drawings.

DESCRIPTION OF THE EMBODIMENTS

Figure 1:
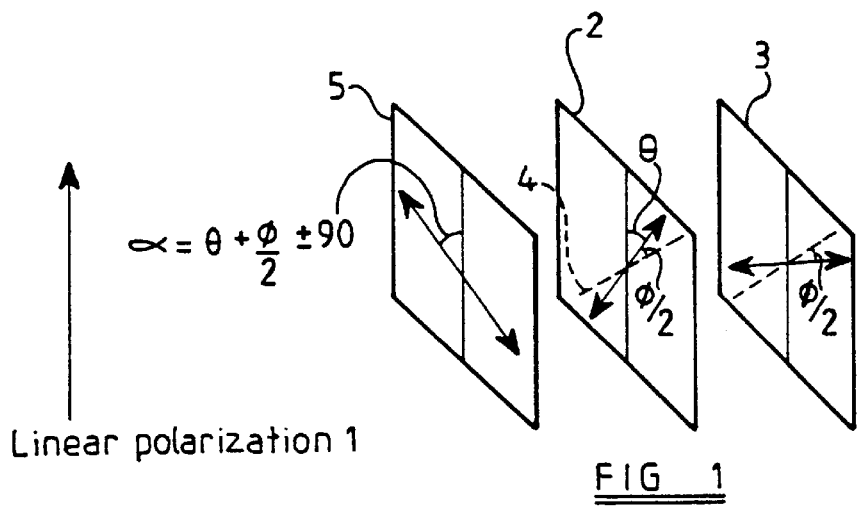
FIG. 1 is a diagram of a system illustrating how two small retarders may be represented by a single retarder.

Like reference numerals refer to like parts throughout the drawings.

FIG. 1 illustrates a system for use with input light having a linear polarization as shown at 1 defining a reference direction for optic axes of the elements of the system. The system comprises first and second retarders 2 and 3, each having a retardation of β. The optic axis of the first retarder 2 is disposed at an angle θ with respect to the reference direction and the optic axis of the second retarder 3 is disposed at an angle of φ with respect to the optic axis of the first retarder 2. The optic axes of the first and second retarders 2 and 3 are therefore disposed at angles of −φ/2 and +φ/2 with respect to the bisectrix 4 of the optic axes. The system finally comprises a retarder 5 having a retardation γ. The optic axis of the retarder 5 is disposed an angle of a=(θ+(φ/2)±90) i.e. perpendicular to the bisectrix 4.

The ellipticity of the system illustrated in FIG. 1 may be calculated from Jones matrices, for instance as disclosed in "Optical Waves in Crystals", Yariv et al, published by John Wiley, 1984, where a value of zero represents linear polarization, a value of ±1 represents circular polarization and intermediate values represent degrees of ellipticity of light passing through the system of FIG. 1 from the retarder 5 through the retarder 3. The retardation γ of the retarder 5 is equal to $2.β. \cos φ$.

Figure 2A:
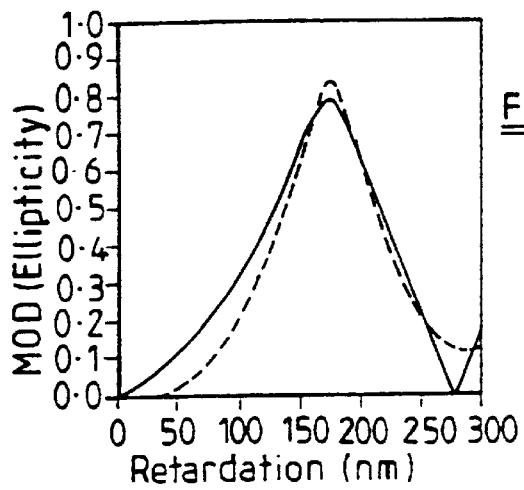
FIGS. 2a to 2c are graphs of the modulus of ellipticity against retardation in nanometers for the system of FIG. 1 with different angular parameters.

FIG. 2a illustrates ellipticity against retardation at a wave length of 550 nanometers, where θ=75° and φ=45°. These parameters are such that the ellipticity deviates most rapidly from the zero with variation of β. The unbroken curve FIG. 2a illustrates this function for the system of FIG. 1 omitting the retarder 5 whereas the broken line illustrates this function for the system shown in FIG. 1. Thus, the ellipticity deviates from zero as the retardation β of each of the retarders 2 and 3 increases. However, this deviation is relatively small for low values of β. In fact, the ellipticity remains less than 0.05 for retardations β less than 50 nanometers for all combinations of retarder orientation.

Figure 2B:
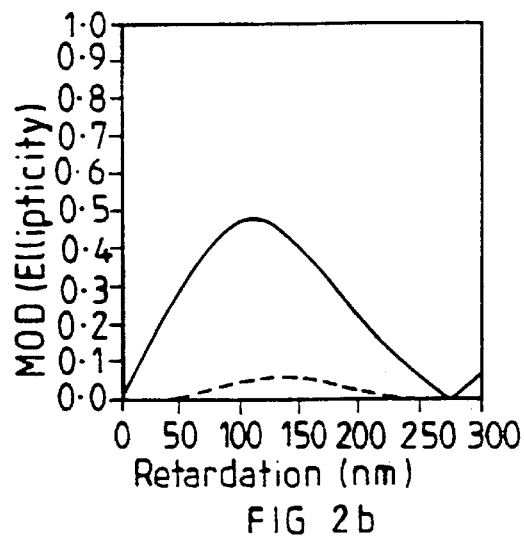
Figure 2C:
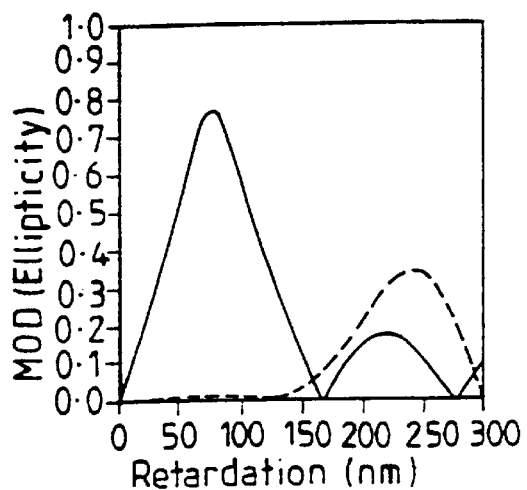

FIG. 2b shows curves similar to those shown in FIG. 2a but for a system of the type shown in FIG. 1 in which θ=15° and φ=60°. Similarly, FIG. 2c illustrates ellipticity for the system of FIG. 1 with θ=30° and φ=30°.

If the first and second retarders 2 and 3 were replaced by a single retarder whose optic axis were aligned in the direction of the bisectrix 4, an ellipticity of zero would be produced for all values of the retardation. Thus, FIGS. 2a to 2c illustrate that the first and second retarders 2 and 3 are, to a good approximation, equivalent to a single retarder whose optic axis is aligned in the direction of bisectrix 4 for relatively small retardations β.

Figure 3:
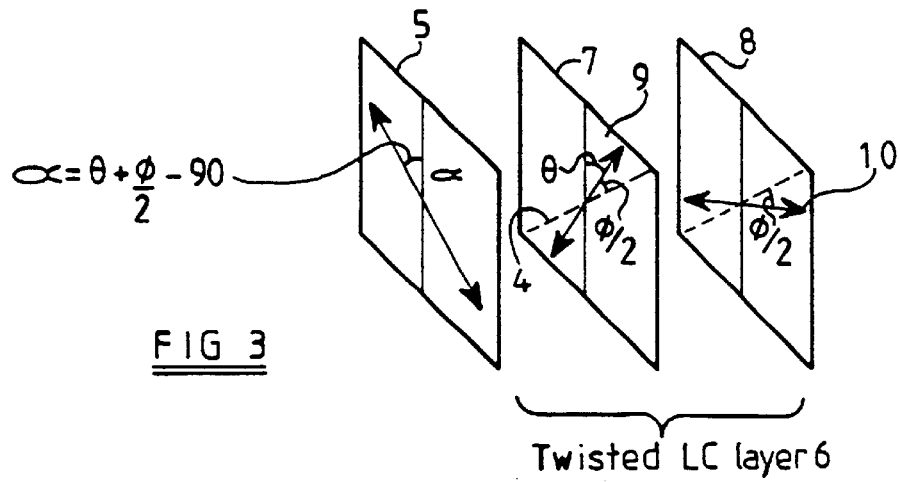
FIG. 3 is a diagram of a system illustrating how a twisted liquid crystal layer with an applied voltage may be approximated by two small uniform retarders.

FIG. 3 illustrates a system in which the individual first and second retarders 2 and 3 are replaced by a twisted liquid crystal layer 6. The liquid crystal layer 6 comprises a nematic liquid crystal, for example of the type known as ZLI-4792 available from Merck. The layer 6 has a twist angle φ=30° and an input director oriented at θ=30° to the input polarization (equivalent to the case of 2c). Accordingly, the optic axis of the retarder 5 is oriented at −45°. The surface director orientations 9 and 10 are shown in the surfaces 7 and 8 of the liquid crystal layer 6 together with the bisectrix 4. The retarder 5 has a retardation γ. The liquid crystal layer 6 has a thickness such that the retardation is 250 nanometers.

In a non-doped twisted liquid crystal, as the voltage is increased above the threshold voltage and the director mid-plane tilt increases, the two regions either side of the mid-plane can be considered to "optically decouple", making them appear to be (at normal incidence) two separate uniform retarders.

The minimum in ellipticity of the system of FIG. 3 may be calculated as a function of the retardation γ of the retarder 5. The voltage across the liquid crystal layer 6 at which the ellipticity minimum occurs may be noted. When the retardation of the retarder 5 cancels the finite voltage residual retardation of the liquid crystal layer 6, the ellipticity is equal to zero. Any deviation from zero would mean that the retarder 5 is not completely cancelling the residual retardation of the liquid crystal layer 6.

Figure 4:
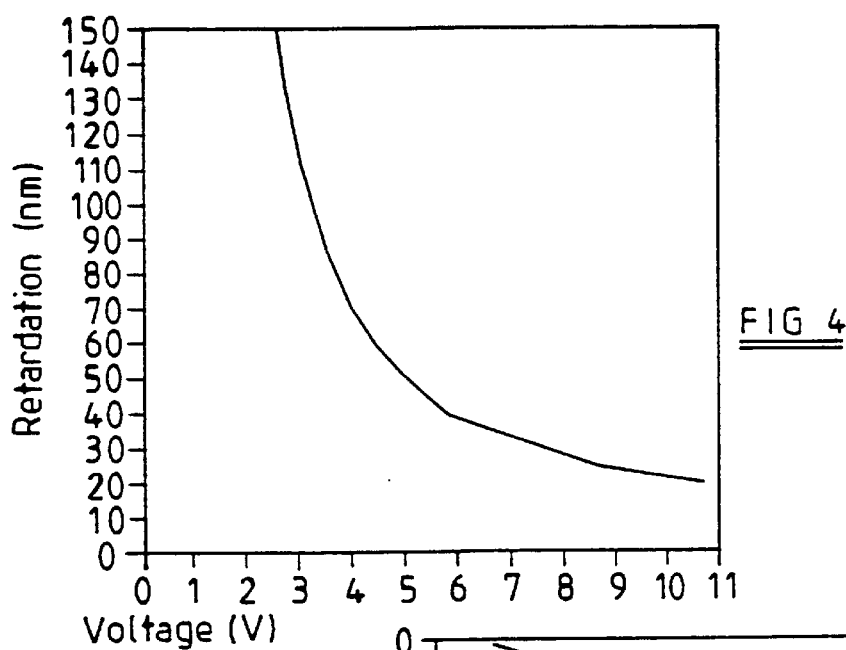
FIG. 4 is a graph of retardation against voltage for which the ellipticity of the system of FIG. 3 is zero.
Figure 5:
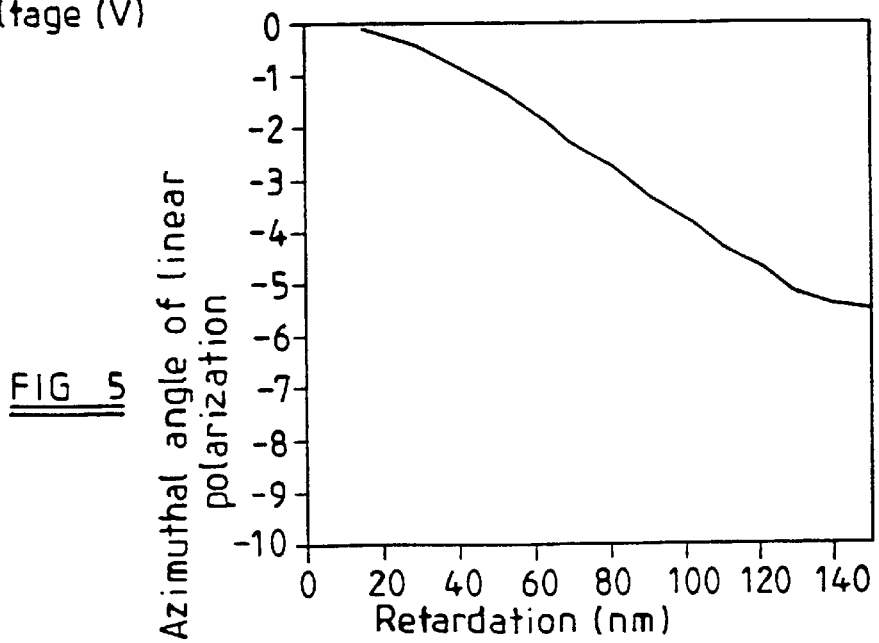
FIG. 5 is a graph of the azimuthal angle of linear polarization against retardation at which the ellipticity is zero for the system of FIG. 3.

The retardation γ for a single wavelength is shown in FIG. 4 as a function of the voltage for which the ellipticity is zero. FIG. 5 illustrates the azimuthal angle of linear polarization from the liquid crystal layer 6 as a function of the retardation γ. The voltage at which the ellipticity is zero decreases as the retardation γ of the retarder 5 increases. However, as the retardation γ increases, two things happen. At some γ value, the ellipticity value deviates from zero indicating that the retarder 5 is no longer compensating the residual retardation of the liquid crystal layer 6. Secondly, the deviation of the aximuthal angle of the polarization state from its original direction increases. If the retarder 5 and the liquid crystal layer 6 were used in transmission, these two facts would mean that the device performance would become worse as γ increased, especially because of the change in polarization azimuth. However, in reflection these two phenomena are not so important, for two reasons. Firstly, in reflection the system has an inherent optical symmetry due to the forward and reverse pass of the light through the components, which means that the deviation of the ellipticity from zero may not have such a marked effect if the optical components have been chosen correctly. Secondly, in reflection the polarization azimuth at the reflector has no bearing on the optical performance of the display; linear polarized light will be reflected as linear polarized light with the same polarization azimuth regardless of the value of the azimuthal angle. Therefore there is a significant advantage of reflection devices over transmission as it is possible to compensate for the residual retardation of a twisted liquid crystal layer over a larger range of retardation values.

Figure 6:
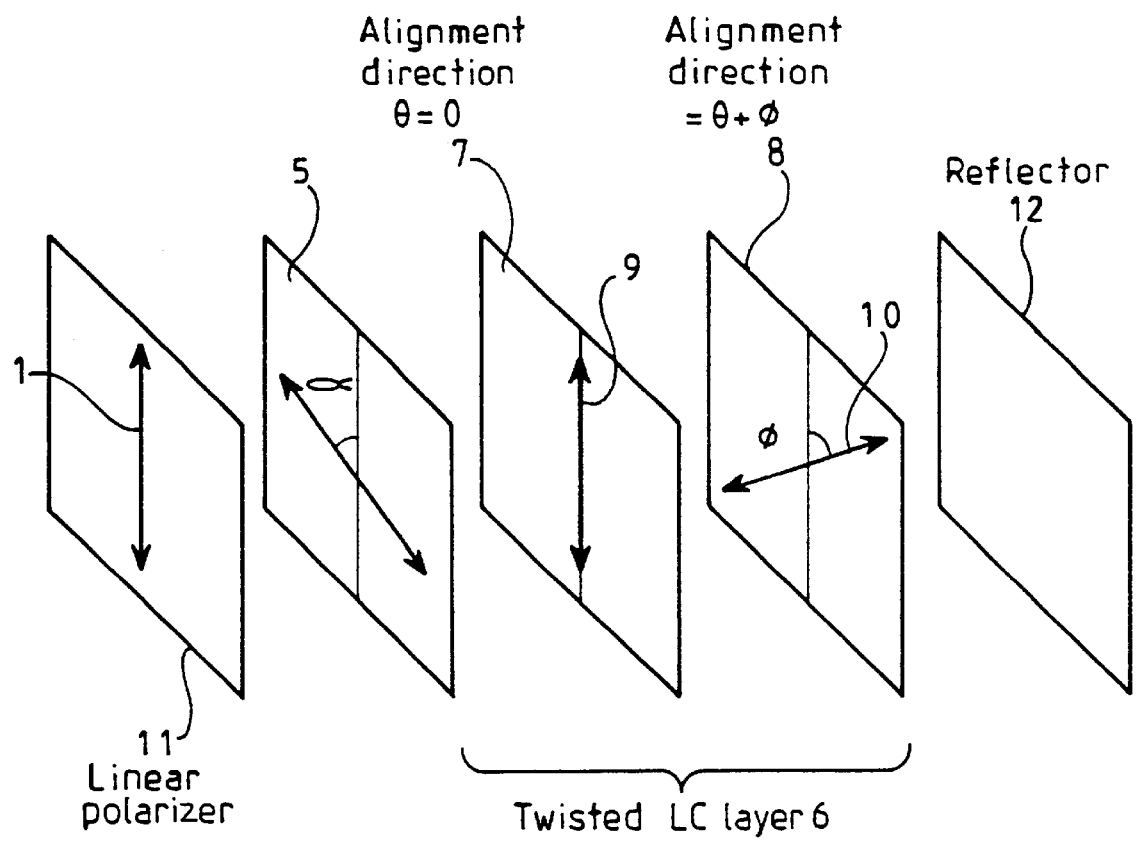
FIG. 6 is a diagram of a reflective liquid crystal display constituting a first embodiment of the invention.

FIG. 6 illustrates a liquid crystal display of the reflective type including the retarder 5 and the liquid crystal layer 6 disposed between a linear polarizer 11 and a reflector 12. the linear polarizer 11 has a transmission direction 1 defining the reference direction as described hereinbefore. The surface director orientation 9 of the surface layer 7 of the liquid crystal layer 6 is oriented at an angle θ to the direction 1 and the layer 6 has a twist φ towards the surface layer 8 so that the alignment direction of the surface layer 8 is (θ+φ±m π), where m=0, 1. For instance, as illustrated in FIG. 6, θ=0 and φ=63.6°. The liquid crystal layer 6 is homogeneously aligned with substantially equal surface pre-tilt.

To produce a twisted liquid crystal layer 6 with a non-splayed director profile at zero applied field and with a positive direction of twist, the surface director orientation 9 is provided by an alignment direction of 0°. This alignment direction may be provided by buffing a polyimide alignment film along the 0° direction. However, other alignment techniques, such as evaporated silicon oxide and photo-aligned polymers, may be used. The surface director orientation 10 is provided by an alignment direction of −116.4° and a pretilt similar to that at the surface layer 7. Alternatively, for a non-splayed director profile at zero applied field, the alignment directions may be 180° and 63.6°.

For a splayed director profile at zero applied field, the alignment directions corresponding to the surface director orientations 9 and 10 may be 0° and 63.6° respectively, or 180° and −116.4° respectively.

The layer 6 comprises the nematic liquid crystal known as ZLI-4792 as described above and having a thickness such that the retardation in the absence of an applied electric field is 250 nanometers. However, other liquid crystals may be used provided they have positive dielectric anisotropy and are of the out-of-plane switching nematic type.

The retarder 5 may be of the NRZ type available from Nitto.

As described hereinbefore, the retarder 5 has an optic axis which is perpendicular to the bisectrix of the surface director orientations 9 and 10. Thus, the orientation of the optic axis α is given by $(\theta+(\phi/2)\pm 90)$ and, as shown in FIG. 6, has a value of −58.2°.

Figure 7:
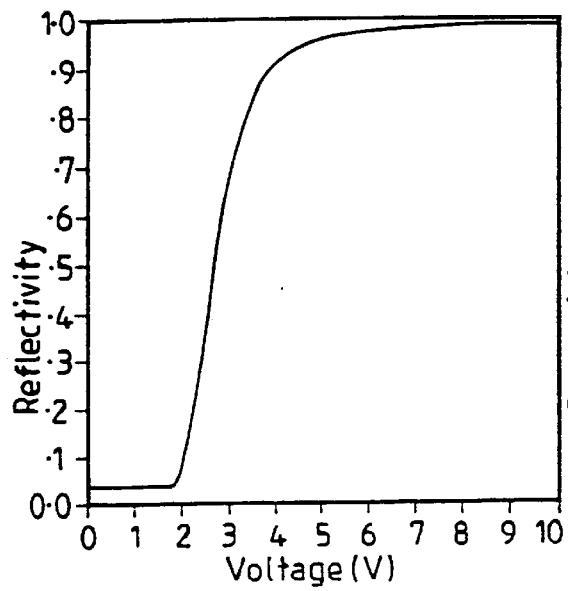
FIG. 7 is a graph of reflectivity against voltage of a display of the type shown in FIG. 6 but omitting a retarder.
Figure 8:
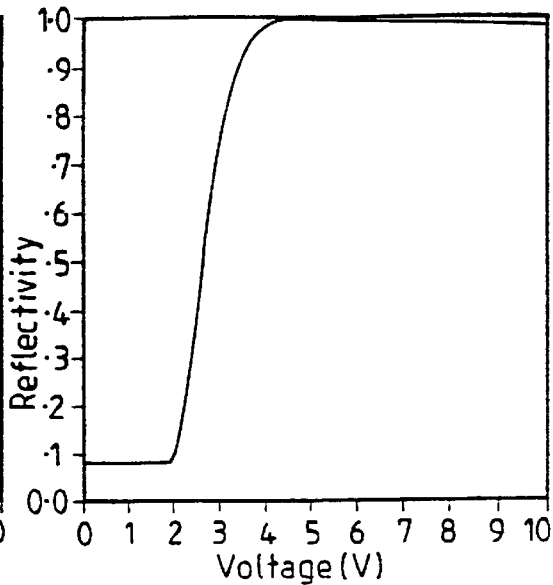
FIG. 8 is a graph of reflectivity against voltage of the display of FIG. 6 with a first set of liquid crystal parameters.

FIG. 7 illustrates the reflected luminance (light source D65) as a function of the voltage applied across the liquid crystal layer 6 for a normally black display of the type shown in FIG. 6 but omitting the retarder 5. The curve of FIG. 7 illustrates that the reflectivity approaches asymptotically the maximum value of 1 as the voltage across the liquid crystal layer 6 increases. Thus, the maximum reflectivity cannot be achieved for a finite voltage. FIG. 8 shows a curve similar to FIG. 7 for the display of FIG. 6 including the retarder 5. The effect of the retarder 5, which has a retardation of 20 nanometers, is to compensate for residual retardation in the layer 6 at a finite voltage so that the maximum reflectivity occurs at a voltage of 5.1 volts. The actual voltage at which the maximum reflectivity occurs may be varied by varying the retardation of the retarder 5. For instance, the voltage may be lowered by increasing the retardation of the retarder 5.

Compared with the performance illustrated in FIG. 7, the dark state of the display is adversely affected by the presence of the retarder 5. This is because the presence of the retarder 5 results in elliptical rather than circular polarization at the reflector 12 when the display is in the dark state. However, the dark state performance can be improved by changing the parameters of the liquid crystal layer 6 so that the layer 6 converts the elliptical state to a circular state, rather than a linear state to the circular state, while maintaining good brightness of the reflective state.

Figure 9:
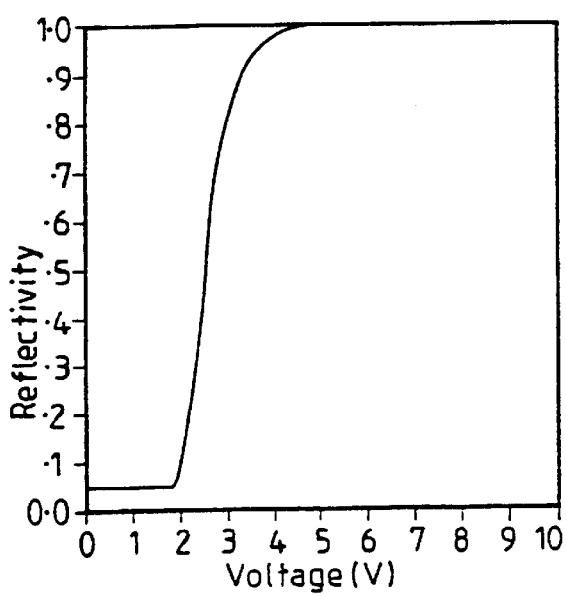
FIG. 9 is a graph of reflectivity against voltage for the display of FIG. 6 with a second set of liquid crystal parameters.

FIG. 9 is a graph similar to FIG. 8 for the display of FIG. 6 but with modified liquid crystal parameters. In this case, the twist ϕ is 57.5° and the zero voltage retardation of the layer 6 is 212.4 nanometers. The retarder 5 has a retardation of 20 nanometers and its optic axis is oriented at −61.25°. The maximum reflectivity occurs at a voltage of 6.0 volts but a reflectivity greater than 0.99 occurs for a voltage of 4.7 volts across the liquid crystal layer 6. However, the dark state performance is improved and has a reflectivity value similar to that illustrated in FIG. 7. Thus, the contrast ratio of the display is improved compared to that illustrated in FIG. 7.

Figure 10:
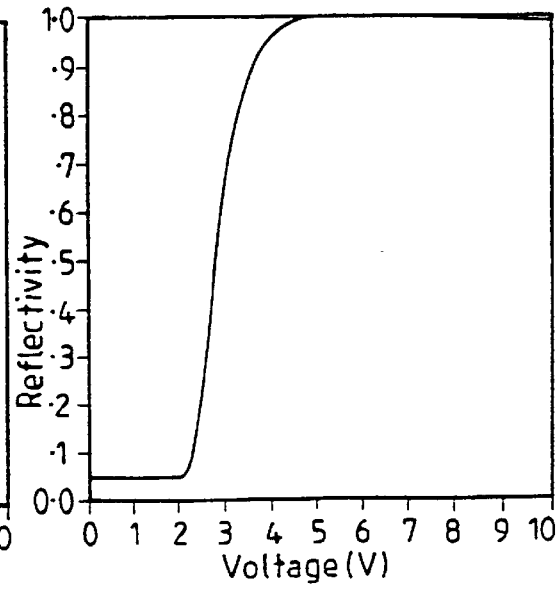
FIG. 10 is a graph of reflectivity against voltage for the display of FIG. 6 with a third set of liquid crystal parameters.

FIG. 10 illustrates the performance for the display of FIG. 6 with ϕ=63.6°, θ=8°, α=−66.2° and the zero voltage retardation of the liquid crystal layer 6 is 242.1 nanometers. The contrast ratio performance is similar to that illustrated in FIG. 9 but, in this case, the maximum reflectivity occurs at a voltage of 6.3 volts.

Figure 18:
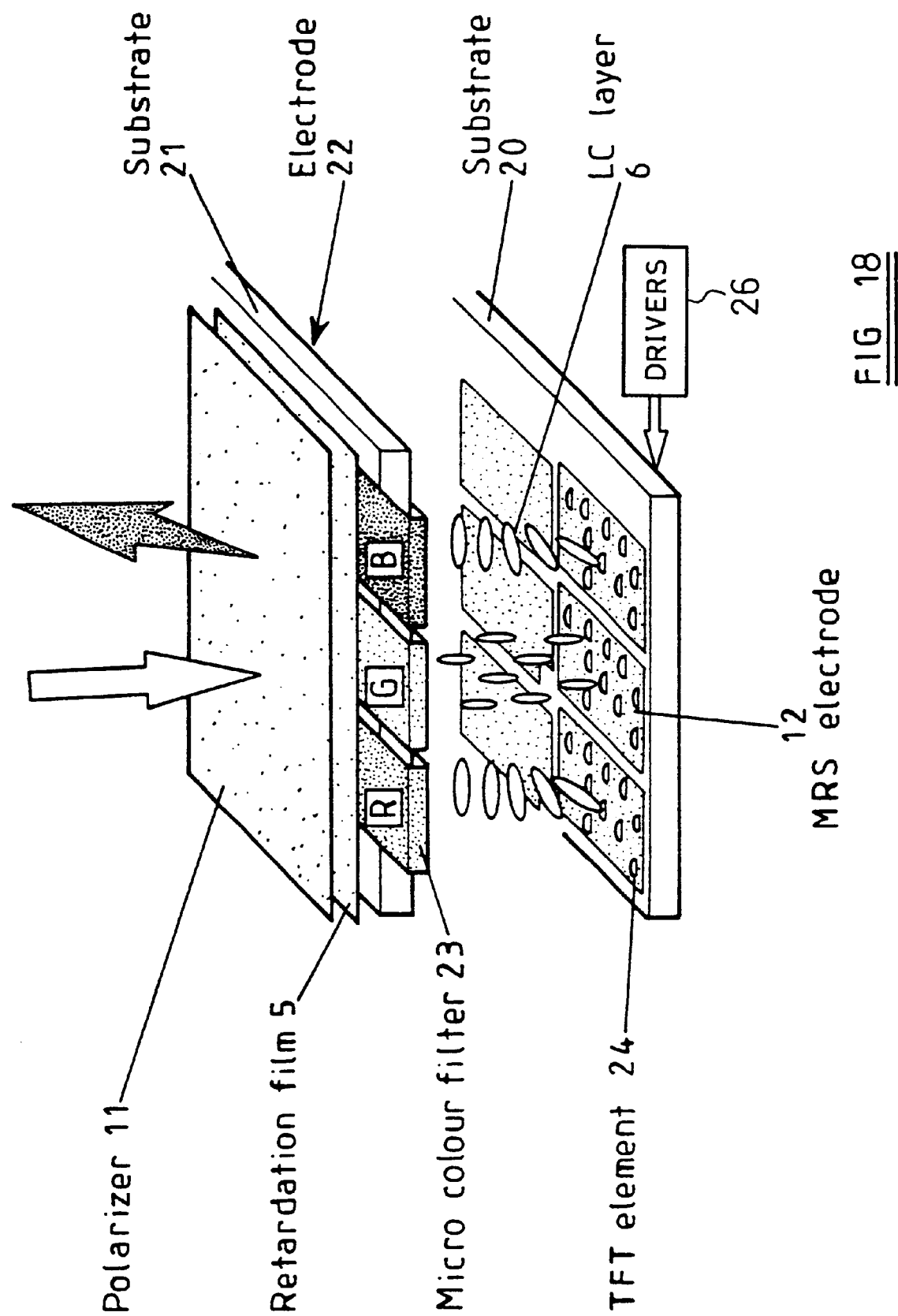
FIG. 18 is a diagram illustrating a pixellated liquid crystal display constituting a fifth embodiment of the invention.

The parameters whose performances are illustrated in FIGS. 9 and 10 provide a similar dark state performance to a display of the type shown in FIG. 6 but with the retarder 5 omitted. However, the maximum brightness state occurs at a voltage across the liquid crystal layer 6 which is attainable by, for instance, active matrix drivers 26 as shown in FIG. 18. By suitable tuning of the parameters of the display, the performance can be optimized for the specific application. For instance, the maximum display brightness for finite or convenient driving voltages can be improved and/or the darkness of the dark state can be improved. Similarly, for displays comprising red, green and blue pixel, the on-state voltage can be optimized for each color and remains convenient.

The sets of the parameters described hereinbefore are given as examples of an infinite number of sets.

Figure 11:
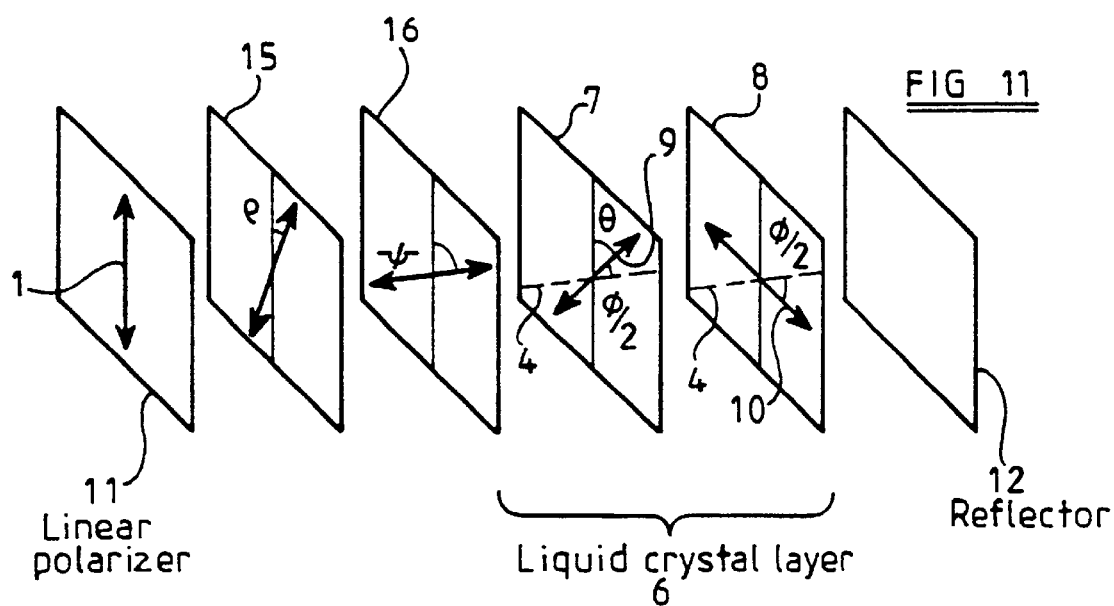
FIG. 11 is a diagram of a liquid crystal display constituting a third embodiment of the invention.

The display shown in FIG. 11 differs from that shown in FIG. 6 in that the retarder 5 is replaced by an achromatic combination retarder comprising a half waveplate 15 and a retarder 16 whose retardation is equal to x.λ/4, where x is a parameter whose value may be selected. The surface director orientations 9 and 10 are oriented as described hereinbefore whereas the optic axes of the half waveplate 15 and the retarder 16 are oriented at ρ and ψ to the reference direction 1. For instance, the half waveplate 15 may have a retardation close to 270 nanometers and ρ=15° whereas the retarder 16 may have a retardation close to 135 nanometers and ψ=75°. The liquid crystal layer 6 may comprise ZLI-4792 as described hereinbefore with a zero voltage retardation of 240 nanometers, θ=40° and ϕ=70°. The surface director orientation 9 may be produced with an alignment direction of 40° and the surface director orientation 10 of −70° to give a 70° twist with no splay in the zero applied field state. However, a liquid crystal layer with parameters close to any of the solutions given in Beynon et al may be used. An optimum bright state is provided when θ=40°, but θ may have any value with only a relatively small effect on the chromaticity of the bright state. The half waveplate 15 and the retarder 16 may be retarders of the NRZ type available from Nitto.

Figure 12:
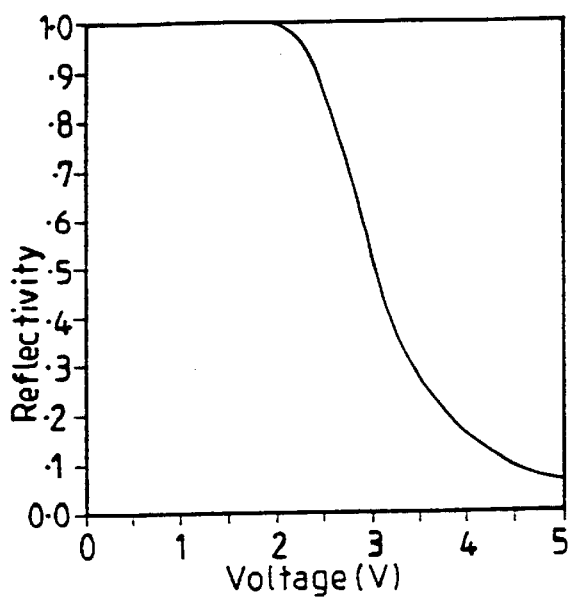
FIG. 12 is a graph of reflectivity against voltage for the display of FIG. 11 with a first set of parameters.

The half waveplate 15 and the retarder 16 comprise a conventional achromatic retarder when x is equal to 1. The reflectivity performance for a display using such a retarder is illustrated in FIG. 12. The reflectivity approaches zero asymptotically as the voltage across the liquid crystal layer 6 increases so that minimum reflectivity cannot be achieved for a finite drive voltage.

Figure 13:
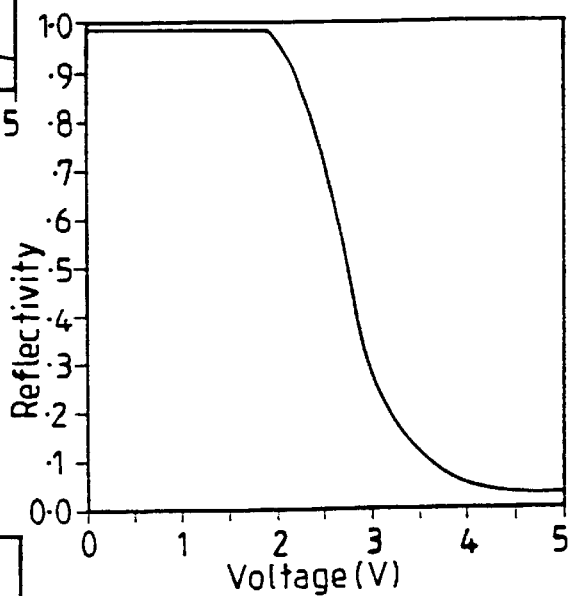
FIG. 13 is a graph of reflectivity against voltage for the display of FIG. 11 with a second set of parameters.

FIG. 13 illustrates the reflectivity for the display of FIG. 11 with the retardation of the retarder 16 reduced below a quarter wave length i.e. below 135 nanometers by 20.6 nanometers, i.e. x≅0.847. The reflectivity of the dark state now reaches a minimum at a voltage of 4.75 volts. Although the maximum reflectivity of the bright state is reduced compared with the performance illustrated in FIG. 12, the contrast ratio of the display for drive voltages less than 5 volts has increased from about 20:1 to about 95:1.

Figure 14:
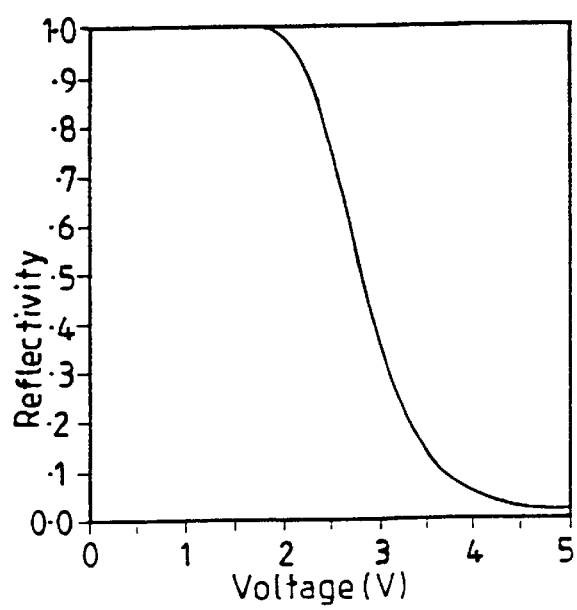
FIG. 14 is a graph of reflectivity against voltage for the display of FIG. 11 with a third set of parameters.

FIG. 14 illustrates the performance improvement which may be obtained by altering the liquid crystal parameters of the layer 6. In this case, the retardation of the retarder 16 is reduced by 27.5 nanometers below a quarter wave length (135 nanometers), (x≅0.796), ϕ=65° and θ=42.5° and the retardation of the layer 6 is 257 nanometers. The dark state performance is similar to that illustrated in FIG. 13 whereas the bright state performance has been substantially improved and approaches that illustrated in FIG. 12. The contrast ratio is greater than 100:1 and the maximum dark state reflectivity occurs for 4.78 volts across the liquid crystal layer 6. Also, the chromaticity of the bright state is improved compared with the performances illustrated in FIG. 13.

An identical optical performance to FIGS. 12–14 can be achieved by using a negative LC twist if the signs of all the other angles in the device are opposite. In the display shown in FIG. 11, the direction of twist of the liquid crystal layer 6 is positive i.e. clockwise from the surface 7 to the surface 8. Although a negative i.e. anti-clockwise direction of twist may be used, the positive direction of twist provides a more achromatic bright state.

Although the liquid crystal layer 6 may have either direction of twist, a more achromatic bright state is provided when the direction of twist is the same as the direction of angular offset from the reference direction 1 of the optic axis of the retarder. Thus, in the embodiment illustrated in FIG. 11 where $\psi<90°$, the offset of the optic axis of the retarder 16 from the reference direction 1 is clockwise and the layer 6 has a clockwise twist from the surface 7 to the surface 8.

Figure 15:
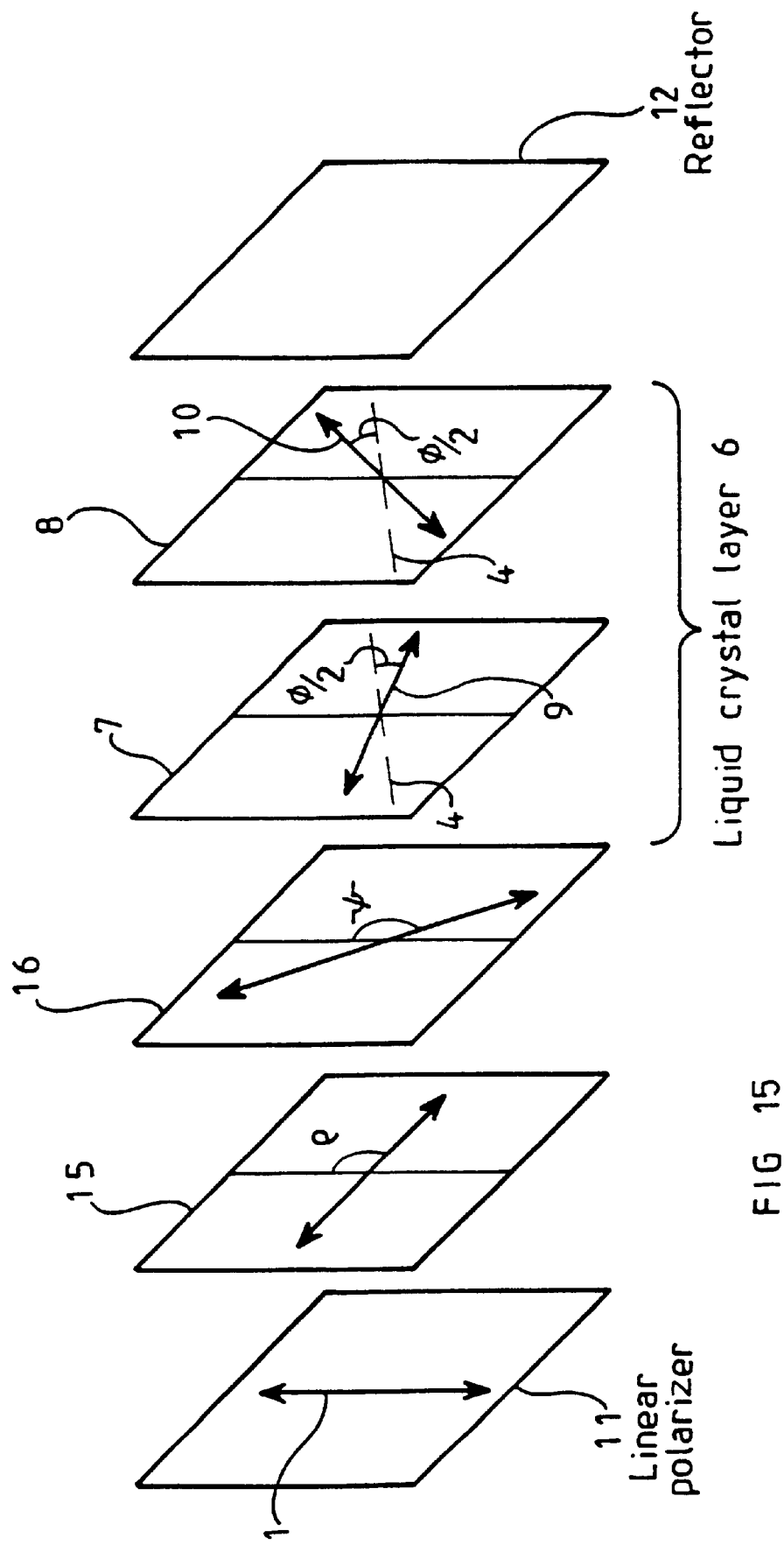
FIG. 15 is a diagram of a reflective liquid crystal display constituting a fourth embodiment of the invention.
Figure 16:
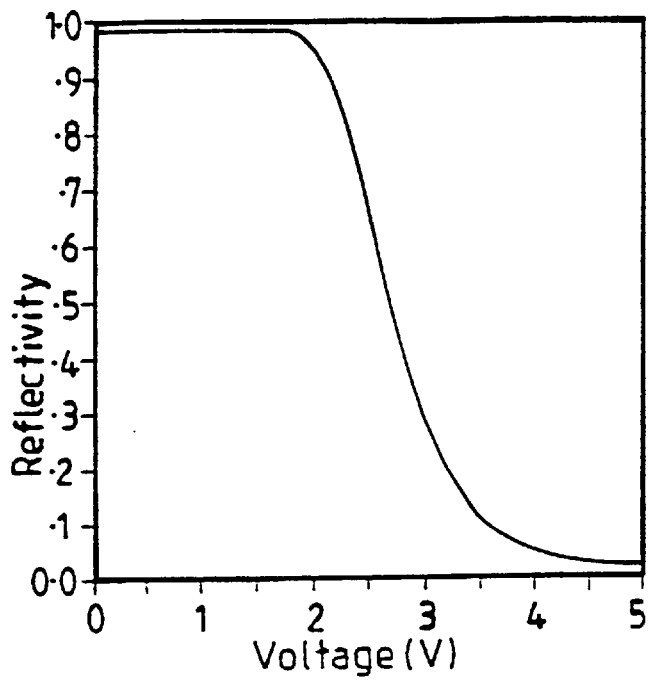
FIG. 16 is a graph of reflectivity against voltage for the display of FIG. 15.

FIG. 15 illustrates a display which differs from that shown in FIG. 11 in that the optic axes of the half waveplate 15 and the retarder 16 are rotated by 90° so that the optic axis of the retarder 16 is perpendicular to the bisectrix of the surface director orientations 9 and 10. The surface director orientations 9 and 10 may be provided by alignment directions of 130° and 240°, respectively. The retardation of the retarder 16 is increased above a quarter wave length by 17 nanometers, i.e. $x \approx 1.126$. The reflectivity of this arrangement is shown in FIG. 16, in which the maximum dark state reflectivity occurs at 5.5 volts and the contrast ratio is greater than 100.

In the embodiment shown in FIG. 15, $\psi>90°$ so that the optic axis of the retarder 16 is offset from the reference direction 1 by $(180°-\psi)$ in the anti-clockwise direction. To provide a more achromatic bright state, the layer 6 has an anti-clockwise twist from the surface 7 to the surface 8.

Figure 17:
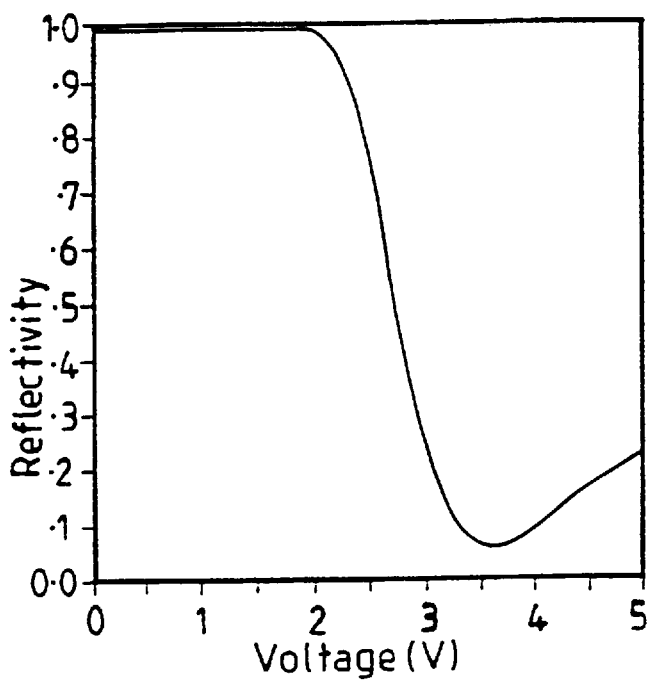
FIG. 17 is a graph of reflectivity against voltage for the display of FIG. 11 with a fourth set of parameters.

FIG. 17 illustrates the reflectivity of the display of FIG. 11 with the retardation of the retarder 16 reduced below a quarter wavelength (135 nanometers) by 75 nanometers in order to maximize the reduction in ON state voltage compared to FIG. 12. The reflectivity of the dark state reaches a minimum at 3.45 volts. The parameters of the liquid crystal are altered to recover the maximum possible bright state value such that $\theta=45°$, $\theta=60°$ and the retardation of the layer 6 is 316 nanometers.

Other liquid crystals may be used having lower threshold voltages than ZLI-4792 and being better optimized for low voltage driving with thin film transistors. An example of such a material is MLC-6476 available from Merck. The bright and dark state voltages may thus be reduced, resulting in lower power consumption. For example, the dark state voltage of FIG. 16 becomes 4.0 volts with MLC-6476.

FIG. 18 illustrates diagrammatically the construction of a color display panel of the active matrix type. The display panel comprises substrates 20 and 21, for instance made of glass. The substrate 20 carries pixel electrodes in the form of a micro-reflective structure (MRS), which acts as the reflector 12. Each of the pixel electrodes is connected to a thin film transistor (TFT) element 24 which is connected to row and column addressing electrodes (not shown). The row and column electrodes may correspond to gate and source electrodes for the thin film transistors.

The substrate 21 carries a plain electrode 22. The retarder 5 comprises a retardation film which is disposed between the polarizer 11 and the substrate 21. A micro color filter 23 is disposed between the liquid crystal layer 6 and the substrate 21 and comprises red (R), green (G) and blue (B) filters. The layout of the optical elements of the display panel shown in FIG. 18 corresponds to the display shown in FIG. 6.

Figure 19:
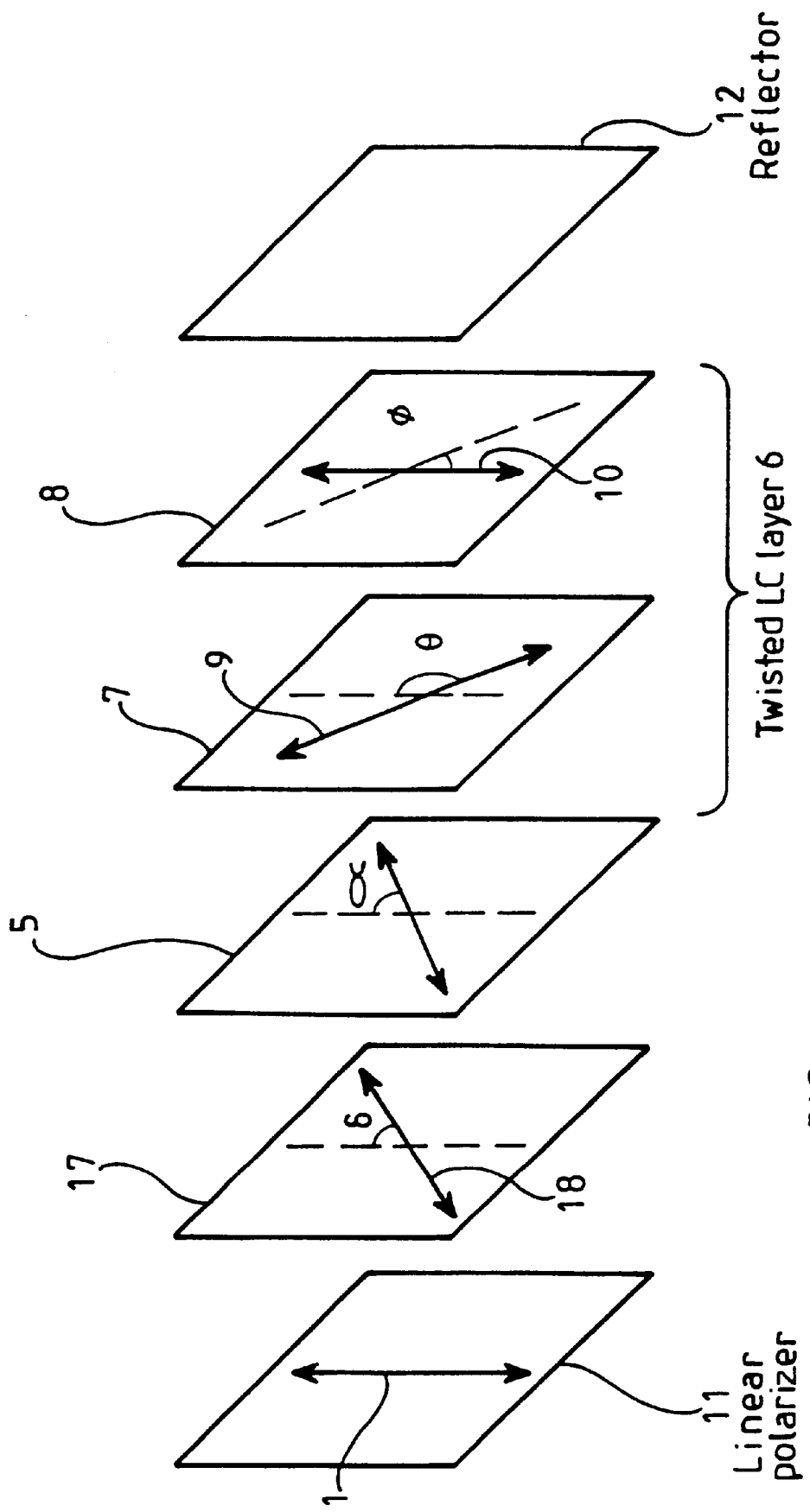
FIG. 19 is a diagram of a reflective liquid crystal display constituting a sixth embodiment of the invention.

FIG. 19 illustrates a display of the same basic type as that shown in FIG. 6 but modified by the inclusion of a quarter waveplate 17 to change the mode of operation from normally black to normally white. The quarter waveplate 17 has an optic axis 18 orientated at an angle $\delta$ of 45° to the reference direction 1. The quarter waveplate 17 has a retardation of about 137.5 nanometers. Note that, the quarter waveplate 17 may be disposed between the liquid crystal layer 6 and the reflector 12.

In this embodiment, the retarder 5 has an optic axis aligned at an angle $\alpha$ of 58.75° to the reference direction 1 and a retardation of 20 nanometers. The surface director orientation 9 at the surface 7 of the twisted liquid crystal layer 6 is aligned at an angle $\theta$ of 120° to the reference direction 1 and the twist $\phi$ of the layer 6 is 57.5°. The surface director orientations 9 and 10 may be provided by alignment directions of 120° and –2.5°, respectively. In the absence of an applied field, the retardation of the layer 6 is 212.4 nanometers.

The following text and drawings refer to cases where the layer 6 is a liquid crystal of the type MLC-6476 available from Merck.

Figure 20:
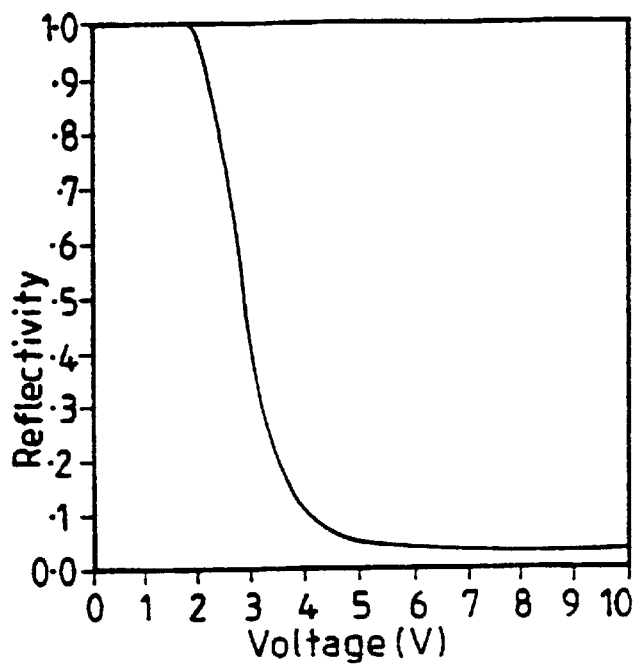
FIG. 20 is a graph of reflectivity against voltage for the display of FIG. 19.

As shown in FIG. 20, the reflectivity of the display of FIG. 19 substantially achieves the maximum value at and close to zero volts. The minimum reflectivity occurs at 7.5 volts but is not a sharp minimum and a good dark state is achieved for voltages above approximately 5 volts. The minimum reflectivity is not particularly low but is determined by the quarter waveplate 17, which is not particularly achromatic.

As described hereinbefore, the dark state voltage may be reduced further by increasing the retardation of the retarder 5 and altering the parameters of the layer 6 as necessary to optimize the bright state. Further, the minimum reflectivity may be reduced by using an achromatic true quarter wave retarder in place of the element 17.

Figure 21:
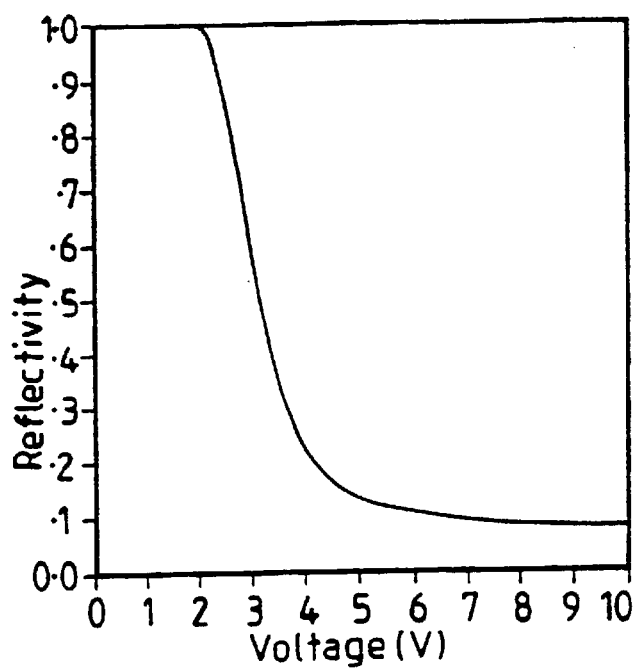
FIG. 21 is a graph of reflectivity against voltage for a display of the type shown in FIG. 19 but omitting a fixed retarder.

For comparison, FIG. 21 illustrates the reflectivity of a display of the type shown in FIG. 19 but with the retarder 5 omitted. The dark state performance of such a display is substantially degraded compared with the performance of the display of FIG. 19 as illustrated in FIG. 20.

Figure 22:
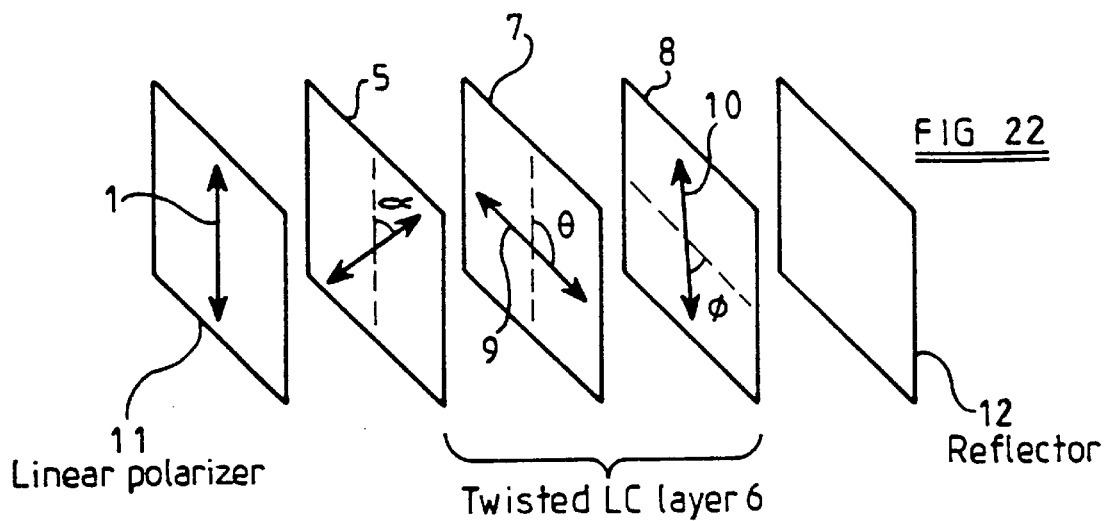
FIG. 22 is a diagram of a reflective liquid crystal display constituting a seventh embodiment of the invention.

FIG. 22 illustrates a normally white display in which, instead of using the fixed retarder 5 of FIG. 19 to compensate for residual retardation in the layer 6, the retardation of the quarter waveplate (5 in FIG. 22) is altered. The optic axis of the quarter waveplate 5 is again oriented at an angle $\alpha$ of 45° to the reference direction but the retardation is changed to 175 nanometers (i.e. about $\lambda/4+40$ nanometers). The surface director orientation 9 of the surface 7 of the layer 6 is oriented at 107.5°, the layer 6 has a twist $\phi$ of 55° and the retardation in the absence of an applied field of the layer 6 is 237 nanometers. The surface director orientations 9 and 10 may be provided by alignment directions of 107.5° and –17.5°, respectively.

Figure 23:
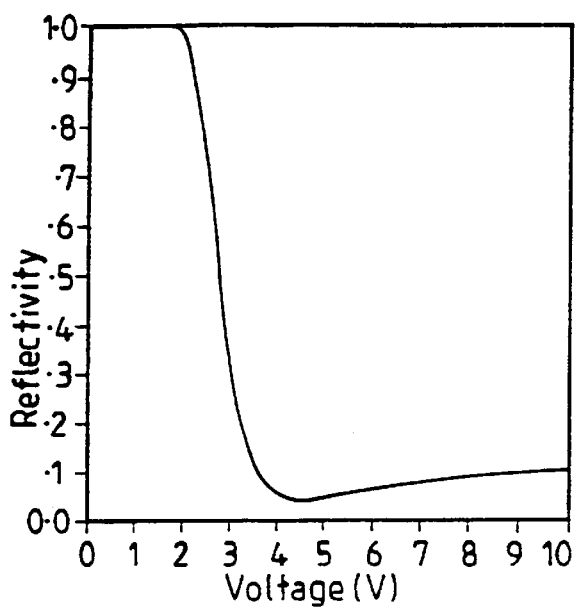
FIG. 23 is a graph of reflectivity against voltage for the display of FIG. 19.

The reflectivity of the display of FIG. 22 is illustrated in FIG. 23. The reflectivity minimum occurs at a voltage of 4.46 volts (lower than FIG. 20 because of the compensation of a larger residual retardation). A similar result may be obtained by decreasing the retardation of the retarder 5 to about 95 nm (i.e., about $\lambda/4-40$ nm) and orientating the twisted LC layer 6 so that the bisectrix of the twist angle is substantially parallel to the optic axis of the retarder 5. The LC retardation and twist angle may need to be slightly altered to recover the bright state, as previously described.

Figure 24:
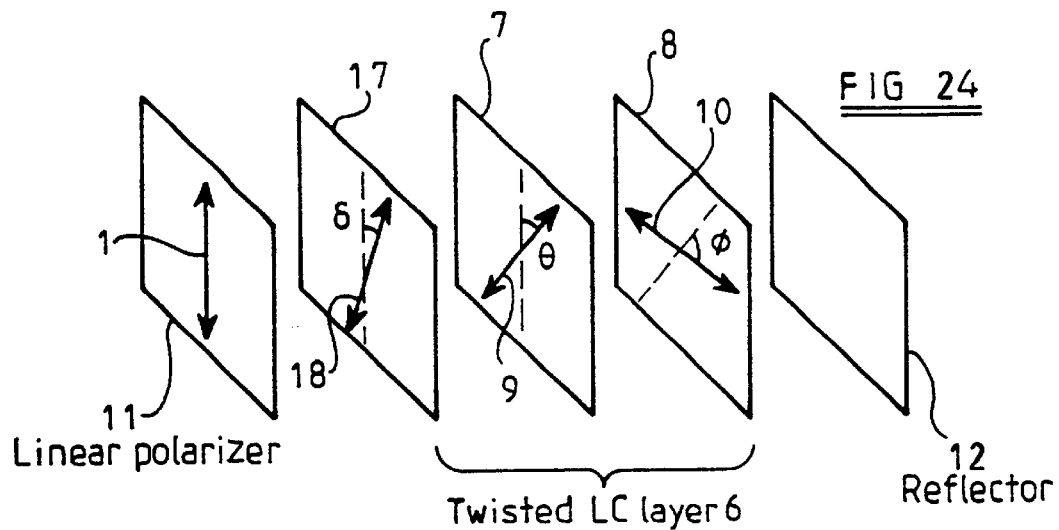
FIG. 24 is a diagram of a reflective liquid crystal display disclosed in European Patent Application No. 97308853.7.

The techniques disclosed herein may be applied to the devices incorporating a twisted liquid crystal layer as a switching element disclosed in European Patent Application No. 97308853.7, the contents of which are hereby incorporated by reference in the present application. For instance, FIG. 24 illustrates a device of the type shown in FIG. 14 of European Patent Application No. 97308853.7. The retarder 17 has an optic axis 18 aligned at an angle $\delta$ of 15° to the reference direction 1 and a retardation of 222.7 nanometers. The surface director orientation 9 is oriented at an angle $\theta$ of 32.5°, the layer 6 has a twist $\phi$ of 63.6° and a retardation of 152.5 nanometers. The surface director orientations 9 and 10 may be provided by alignment directions of 32.5° and −83.9°, respectively.

Figure 25:
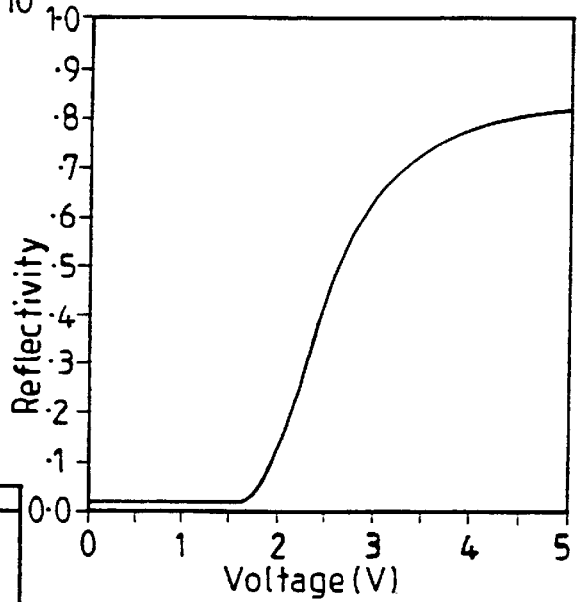
FIG. 25 is a graph of reflectivity against voltage for the display of FIG. 24.

FIG. 25 illustrates the reflectivity performance of the display of FIG. 24. The maximum reflectivity occurs above 5 volts and is substantially less than the maximum possible value.

Figure 26:
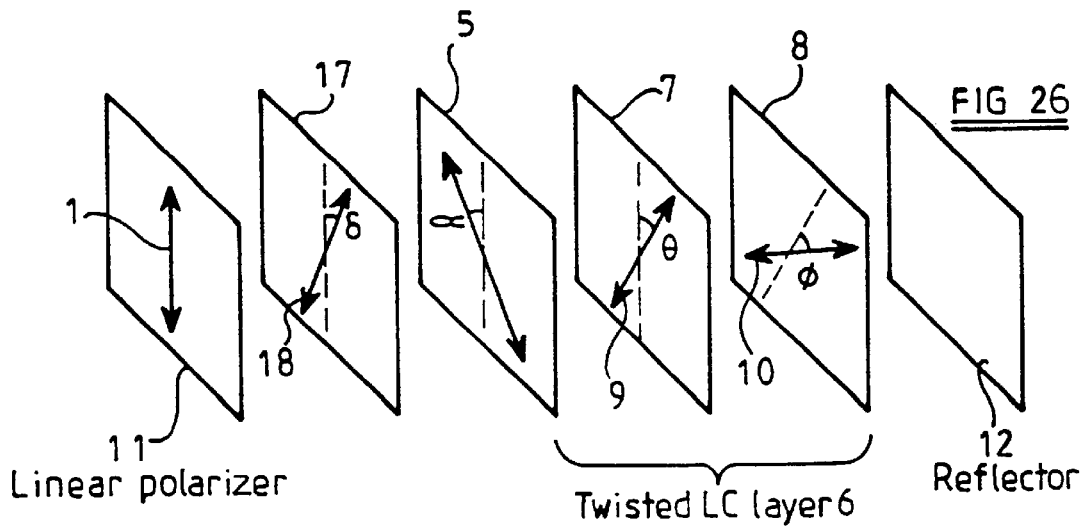
FIG. 26 is a diagram of a modification of the display of FIG. 24 to provide an eighth embodiment of the invention.

FIG. 26 shows the device of FIG. 24 modified by the inclusion of the retarder 5 so as to provide an embodiment of the present invention. The retarder 5 has its optic axis aligned at an angle α to the reference direction 1 of −33.2° and a retardation of 50 nanometers. The parameters of the twisted liquid crystal layer 6 are modified such that the surface director orientation 9 is oriented at an angle θ of 29.5°, the twist φ of the layer 6 is 54.6° and the retardation of the layer 6 is 208.5 nanometers. The surface director orientations 9 and 10 may be provided by alignment directions of 29.5° and −95.9° respectively.

Figure 27:
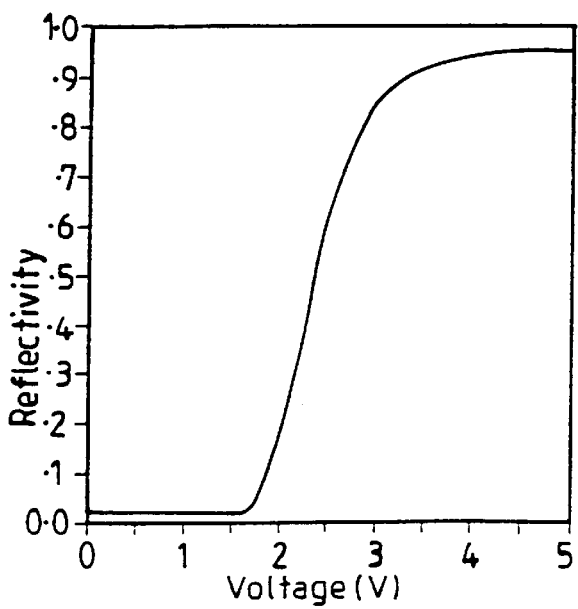
FIG. 27 is a graph of reflectivity against voltage for the display of FIG. 26.

FIG. 27 illustrates the reflectivity performance of the display of FIG. 26. Comparing the performances shown in FIGS. 27 and 25, the display of FIG. 26 illustrates a much higher reflectivity maximum which is achievable at about 5 volts. The bright state performance and the contrast ratio of the display shown in FIG. 26 are therefore substantially improved compared with the display of FIG. 24.

The invention being thus described, it will be obvious that the same may be varied in many ways. Such variations are not to be regarded as a departure from the spirit and scope of the invention, and all such various modifications as would be obvious to one skilled in the art are intended to be included and may be made within the scope of the following claims. For instance, any of the retarders described hereinbefore may be biaxial so as to improve viewing angle. It is intended that the reflective devices described in this invention may be used either as direct view reflection displays, or in reflective projection display systems. In direct view displays, a single linear polarizer is conventionally used as the means of polarization at the front of the device. In projection, the display system may use either a single polarizer or a polarizing beam splitter depending on the design of the optical system.

What is claimed is:

1. A liquid crystal device comprising:
   a layer of twisted liquid crystal having a first surface director orientation oriented in a first direction at a first surface of the layer and a second surface director orientation oriented in a second direction at a second surface of the layer, the first direction being different from and non-perpendicular to the second direction;
   a retarder arranged immediately adjacent the layer to compensate for a residual retardation of the layer with a first finite applied field across the layer, the retarder having an optic axis which is substantially parallel or perpendicular to the bisectrix of the first and second directions; and
   a reflector for reflecting light transmitted through the layer,
   wherein the retarder is a waveplate whose retardation is equal to $\lambda/4 \pm$ the residual retardation, where $\lambda$ is a working wavelength of the device.

2. The device as claimed in claim 1, in which the retarder is disposed between the layer and at least one $\lambda/2$ plate.

3. The device as claimed in claim 1, in which the retardation of the retarder is substantially equal to the sum of $\lambda/4$ and the residual retardation and the optic axis of the retarder is substantially perpendicular to the bisectrix of the first and second directions.

4. The device as claimed in claim 3, in which the retarder is disposed between the layer and at least one $\lambda/2$ plate.

5. The device as claimed in claim 1, in which the first finite applied field corresponds to a potential difference across the layer of less than or equal to seven volts.

6. The device as claimed in claim 1, in which the layer produces a retardation substantially equal to $\lambda/4$ with a second finite applied electric field across the layer, where the second finite applied field is different from the first finite applied field and corresponds to substantially zero potential difference across the layer, and $\lambda$ is a working wavelength of the device.

7. The device as claimed in claim 6, in which the retarder is disposed between the layer and a quarter waveplate.

8. The device as claimed in claim 1, in which the layer is homogeneously aligned.

9. The device as claimed in claim 1, in which the layer is pixellated.

10. The device as claimed in claim 1, in which the retarder and the layer are disposed between a linear polarizer and the reflector.

11. A liquid crystal device comprising:
    a layer of twisted liquid crystal having a first surface director orientation oriented in a first direction at a first surface of the layer and a second surface director orientation oriented in a second direction at a second surface of the layer, the first direction being different from and non-perpendicular to the second direction;
    a retarder arranged immediately adjacent the layer to compensate for a residual retardation of the layer with a first finite applied field across the layer, the retarder having an optic axis which is substantially parallel or perpendicular to the bisectrix of the first and second directions; and
    a reflector for reflecting light transmitted through the layer,
    wherein the retardation of the retarder is substantially equal to $\lambda/4$ minus the residual retardation and the optic axis of the retarder is substantially parallel to the bisectrix of the first and second directions, where $\lambda$ is a working wavelength of the device.

12. The device as claimed in claim 11, in which the retarder is disposed between the layer and at least one $\lambda/2$ plate.

13. A liquid crystal display comprising:
    a liquid crystal device including a layer of twisted liquid crystal having a first surface director orientation oriented in a first direction at a first surface of the layer and a second surface director orientation oriented in a second direction at a second surface of the layer, the first direction being different from and non-perpendicular to the second direction, a retarder arranged immediately adjacent the layer to compensate for a residual retardation of the layer with a first finite applied field across the layer, the retarder having an optic axis which is substantially parallel or perpendicular to the bisectrix of the first and second directions, and a reflector for reflecting light transmitted through the layer;
    polarizing means for polarizing light incident on the display; and
    controlling means for controlling the voltage applied to the layer of twisted liquid crystal,
    wherein the retarder is a waveplate whose retardation is equal to $\lambda/4 \pm$ the residual retardation, where $\lambda$ is a working wavelength of the device.

14. The liquid crystal display as claimed in claim 13, wherein the retarder is disposed between the layer and at least one $\lambda/2$ plate.

15. The liquid crystal display as claimed in claim 13, wherein the retardation of the retarder is substantially equal to the sum of $\lambda/4$ and the residual retardation and the optic axis of the retarder is substantially perpendicular to the bisectrix of the first and second directions.

16. The liquid crystal display as claimed in claim 15, wherein the retarder is disposed between the layer and at least one $\lambda/2$ plate.

17. The liquid crystal display as claimed in claim 13, wherein the first finite applied field corresponds to a potential difference across the layer of less than or equal to seven volts.

18. The liquid crystal display as claimed in claim 13, wherein the layer produces a retardation substantially equal to $\lambda/4$ with a second finite applied electric field across the layer, where the second finite applied field is different from the first finite applied field and corresponds to substantially zero potential difference across the layer, and $\lambda$ is a working wavelength of the device.

19. The liquid crystal display as claimed in claim 18, wherein the retarder is disposed between the layer and a quarter waveplate.

20. The liquid crystal display as claimed in claim 13, wherein the layer is homogeneously aligned.

21. The liquid crystal display as claimed in claim 13, wherein the layer is pixellated.

22. A liquid crystal display comprising:

a liquid crystal device including a layer of twisted liquid crystal having a first surface director orientation oriented in a first direction at a first surface of the layer and a second surface director orientation oriented in a second direction at a second surface of the layer, the first direction being different from and non-perpendicular to the second direction, a retarder arranged immediately adjacent the layer to compensate for a residual retardation of the layer with a first finite applied field across the layer, the retarder having an optic axis which is substantially parallel or perpendicular to the bisectrix of the first and second directions, and a reflector for reflecting light transmitted through the layer;

polarizing means for polarizing light incident on the display; and controlling means for controlling the voltage applied to the layer of twisted liquid crystal, wherein the retardation of the retarder is substantially equal to $\lambda/4$ minus the residual retardation and the optic axis of the retarder is substantially parallel to the bisectrix of the first and second directions, where $\lambda$ is a working wavelength of the device.

23. The liquid crystal display as claimed in claim 22, wherein the retarder is disposed between the layer and at least one $\lambda/2$ plate.

* * * * *